July 25, 1967 S. G. CALAFUT ETAL 3,332,291
INERTIAL FORCE SENSOR
Filed April 10, 1964

INVENTORS
STANLEY G. CALAFUT
MARY A. CALAFUT
BY Harold W. Adams
ATTORNEY

3,332,291
INERTIAL FORCE SENSOR
Stanley G. Calafut and Mary A. Calafut, both of 410 2nd St., Eynon, Pa. 18418
Filed Apr. 10, 1964, Ser. No. 358,957
8 Claims. (Cl. 73—505)

This invention relates to an inertial force sensor and more particularly to an electronic device for sensing an inertial force and its direction.

Whenever particles within a media have the freedom of independent motion, as in the case of fluid flow, a spiral alignment develops therein whenever this motion is confined to a narrow plane and the particles are drawn inward toward a centrally located sink by a force concentrated at this point. Since this force exerts only a radial attraction on each of the individual particles within this media, the particular spiral motion must assume its direction from forces created by an externally applied disturbance which, however small, will initiate a spiral flow that can easily be detected. Because inertial rotation exerts such an external disturbance, a device employing this principle is designed to detect the existence of such a rotation.

It is an object of this invention (1) to generate a spiral movement of particles within a device to be known as an inertiatron, (2) to detect its direction, and (3) to thereby determine the existence of inertial rotation at extremely low rates about an axis perpendicular to this plane of spiral motion.

An inertial force sensor for accomplishing these and many other objects in accordance with the principles of this invention which may in general comprise: a tube having an evacuated chamber therein; an electron emitter positioned in said chamber; an electron collector including a ferromagnetic core spaced from said emitter; means for establishing an electrostatic field between said emitter and said collector whereby electrons are attracted toward said collector; a guide hole between said emitter and said collector, the center of said guide hole lying on the longitudinal axis of said core, said electrons entering said guide hole at right angles thereto in the absence of any inertial force and in a spiral motion about said longitudinal axis of said core in the presence of an inertial force, said spiral motion of said electrons within said guide hole varying the axial magnetic field of said ferromagnetic core; and means for sensing said changes in said magnetic field and the direction thereof.

These and many other advantages of the invention will become apparent from the following detailed description when read in view of the appended drawing wherein FIGURE 1 is a cross sectional view of a preferred embodiment of the invention;

Heretofore, the mechanical gyroscope has been the principal device used to detect inertial rotation. An inertiatron, however, when installed on a gyro stabilized platform, will supplement the long term performance of the gyroscopic system by allowing a means of checking, and thereby correcting, excessive gyro drift which may have developed in the course of its operation.

Figure 1:
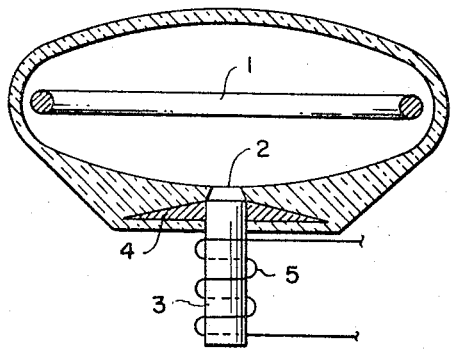

Referring now to the drawing FIGURE 1 is a cross-sectional view of a particle accelerating inertiatron. This electronic device is a glass enclosed two-element vacuum tube having a composition of substances very similar to those found in a typical vacuum diode. The cathode, or particle emitter, encircles the outer circumference of the evacuated area and is designed as 1. The material in this part is composed of thoriated tungsten and is operated at an elevated temperature from energy supplied by an external source. 2 is a discharge guide hole through which all particles must pass to reach the anode. This hole has a sharply defined rim and a slight taper which extends to the surface of the anode. The anode is made up of a ferromagnetic portion 3, and a copper portion 4, and is designed to: (a) conduct all tube currents, (b) concentrate within its core any axial magnetic field that may be have developed due to the spiral movement of electrons toward the guide hole, and (c) to establish an electrostatic field within the tube which will induce electron flow to approach the discharge guide hole at a 90 degree angle to the axis of this hole. As before stated in the absence of an external inertial force the electrons streaming from the cathode to the anode will enter the guide hole at right angles to the hole and the longitudinal axis of the ferromagnetic core without effecting any change within the axial magnetic field of the core. However in the presence of an external inertial force the electrons streaming from the cathode will be caused to travel in a spiral path about the longitudinal axis of the core and within the guide hole. This spiral motion about the longitudinal axis of the core produces a variation in the axial magnetic field of the core which in turn induces a voltage in a detector coil 5. The detector is designated as 5 and consists of a coil of insulated wire wound around a spool into which the ferro-magnetic anode core has been inserted.

Figure 2:
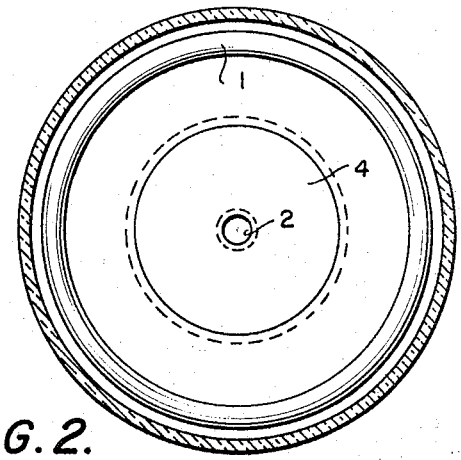
FIGURE 2 is a plan view of the structure shown in FIGURE 1.

FIGURE 2 represents the top view of the glass enclosed inertiatron and labeled thereon are the corresponding parts which have been identified and described in the cross-sectional view of FIGURE 1.

Figure 3:
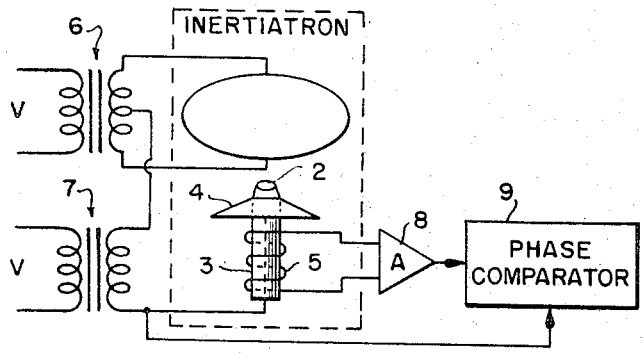
FIGURE 3 is an electrical schematic view of the invention.

Given in FIGURE 3 is the best mode contemplated for operating this device. 6, the heater voltage and 7, the anode voltage transformers, are external components required to energize this inertiatron. An alternating anode voltage is applied herein order to allow improved detection and a continuous recycle of particle movement. 8, the amplifier, is used to raise the level of the signal induced in the detector to a more useful value. The direction of inertial rotation can then be determined by the phase relation of the detector output with reference to the anode voltage supply by means of a phase comparator 9.

In FIGURES 4, 5, 6 and 7 are given sketches having no direct functional relationship with the invention but are intended to facilitate a better understanding of its operation. These are explained in the following description.

Theory of operation and detailed description

The phenomenon observed at the orifice of a vessel when a liquid at equilibrium is being drained is called the Coriolis effect. This vortex, or whirlpool, is produced by the earth's rotation about its axis, and in the Northern Hemisphere results in a vortex spiral that is always counter-clockwise. Since the earth rotates about its axis at a rate of 15 degrees per hour, the component of rotation imparted on the vessel would be 15 sine $L$ degrees per hour, where L denotes the latitude at which the vessel is located. This rate is very small at its maximum (at either the North or South poles) and would not normally be detected by ordinary visual observations. However, the swirl rate observed at the orifice is several thousand times this rate, in effect, a high amplification of the earth's rotation.

This phenomenon is intended to serve as the principle of operation for a device which, as conceived by the authors, will detect the rotation of bodies about an axis at extremely low rates. It becomes the primary purpose hereto describe such a device in terms of theory of operation and details.

Figure 4:
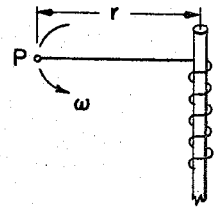
FIGURES 4, 5, 6 and 7 are schematic views illustrating the principle of operation of the invention incorporated in the structure shown in FIGURES 1, 2 and 3.
Figure 5:
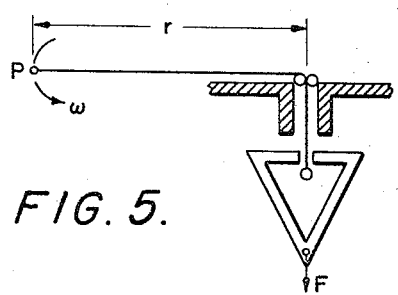

A theoretical value for the amplification of the angular velocity $\omega$ of a particle which is drawn radially toward the center of rotation is examined for two cases:

(1) When the particle with an angular velocity $\omega_1$ is allowed to pull itself inward by successively winding around its own binding post (see FIG. 4). Neglecting losses, the energy of the particle at outer radius $r_1$ due to $\omega_1$ will be the same when the particle reaches inner radius $r_2$. If its angular velocity at this point is called $\omega_2$, then the energy of the particle E is given as:

$$E = \tfrac{1}{2} m r_1^2 \omega_1^2 = \tfrac{1}{2} m r_2^2 \omega_2^2$$

where $m$ is the mass of the particle. Solving for $\omega_2$, the expression $\omega_2 = \omega_1 r_1/r_2$ is obtained indicating that the angular velocity increases inversely with the radius of rotation.

(2) When the particle is pulled toward the center of rotation by the application of an external force (F) (see FIG. 5), an additional amount of energy is supplied to the original energy of $\tfrac{1}{2} m r_1^2 \omega_1^2$ by the amount of $F\Delta r$, where the value of F is given by:

$$F = m r \omega^2$$

Thus, when the radius is decreased to $r_2$ by application of an appropriate force, the increased energy is given by the following:

$$\tfrac{1}{2} m r_1^2 \omega_1^2 + \int_{r_1}^{r_2} m r \omega^2 (-dr) = \tfrac{1}{2} m r_2^2 \omega_2^2$$

The solution yields the expression $\omega_2 = \omega_1 (r_1/r_2)^2$, showing that the angular velocity of the particle increases inversely with the square of the radius of rotation.

Yet the theoretical reasoning of Case 2 alone cannot begin to account for the high rate of fluid swirl that takes place at the vortex. Therefore, other factors must also be examined to shed more light on what may occur to create this condition.

Figure 6:
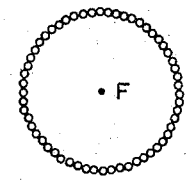
Figure 7:
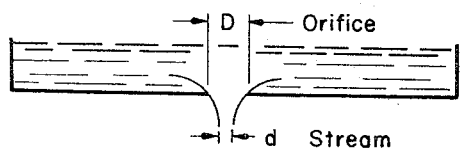

Consider the circular segment of a single layer of fluid in FIG. 6 as being composed of incompressible particles, each attracted toward the center with an equal force. Under these conditions, an outside disturbance would be required to break each and every ring formed in order to allow particle movement toward the central force of attraction. Such configuration does not allow an orderly movement of particles toward the central force and must be supplemented by some inward spiral, the direction of which is determined by some outside influence.

Another logical consequence of the spiral configuration is the greater discharge rate that can naturally be attained through an orifice of a shallow vessel. See FIG. 7. A strictly radial flow toward the orifice would slow the discharge rate by compressing the stream flow diameter $d$. Since the pressure head over the vortex is small in a shallow vessel, particles moving on the vortex with a radial velocity will not experience much vertical movement until most of the energy due to their radial velocity has been dissipated. Whenever the aggragate of these particles do not come in on dead center, this energy goes into the creation of the vortex swirl by forming a chain of couples over the vortex with particles from other areas. Hence, the swirl rate becomes a function of not only the initial angular velocity and radius of the particle, but also the inward or radial velocity at the vortex.

The principles described in the foregoing have all been employed in the development of the vacuum tube inertiatron. Again referring to FIG. 1, the electronic particles emitted from the cathode 1 are forced to approach the guide hole 2 from an angle perpendicular to the direction of flow in this hole. This is accomplished by the configuration of the anodes 3 and 4 which also acts as the central force of attraction and the sink for all particles received. This peculiar anode shape is designed to create a desirable potential gradient within the tube and not to absorb plate dissipation losses. The copper plate 4 is non-ferromagnetic and when the anode voltage is impressed thereon creates an electrostatic field within the evacuated chamber. This electrostatic field acts as a central force of attraction for the electrons streaming from the cathode inducing the electrons to flow at right angles into the guide hole 2 which acts as a sink. Any circular movement by particles at the hole are detected by a coil 5 which converts a change in axial magnetic field into a varying voltage.

Although a preferred embodiment has been described in detail numerous changes and modifications may be made within the principles of the invention which is to be limited only by the scope of the appended claims.

What is claimed is:

1. A sensor for detecting spiral motion of electrons in the presence of an inertial force comprising:
   a tube having an evacuated chamber therein;
   an electron emitter positioned in said chamber;
   an electron collector including a ferromagnetic core spaced from said emitter, the ferromagnetic core having a longitudinal axis substantially normal to the plane in which said emitter lies;
   means for establishing an electrostatic field between said emitter and said collector whereby electrons are attracted toward said collector;
   a guide hole between said emitter and said collector, the center of said guide hole lying on the longitudinal axis of said core, said electrons entering said guide hole at right angles thereto in the absence of any inertial force and in a spiral motion about said longitudinal axis of said core in the presence of an inertial force, said spiral motion of said electrons within said guide hole varying the axial magnetic field of said ferromagnetic core; and
   means for sensing said changes in said magnetic field and the direction thereof.

2. A device as defined in claim 1 wherein said tube is cylindrical in cross section and said electron emitter comprises a circular cathode encircling the outer circumference of said evacuated chamber.

3. A device as defined in claim 2 wherein said electron collector comprises a central cylindrical core of ferromagnetic material forming the bottom of said guide hole and an outer circular conductive plate of non-ferromagnetic material affixed to said core and insulated from said cathode, said conductive plate for establishing an electrostatic field within said evacuated area inducing electron flow at right angles into said guide hole.

4. A device as defined in claim 1 wherein said means for establishing an electrostatic field comprises a source of alternating voltage impressed on said anode.

5. A device as defined in claim 1 wherein said sensing means comprises a detector coil positioned around said core for producing a voltage in response to variations of the magnetic field of said core.

6. A device as defined in claim 5 including means connected to said detector coil for amplifying any voltage induced in said detector coil.

7. A device as defined in claim 5 including means for comparing the phase of said anode voltage and said voltage induced in said detector coil thereby indicating the direction of said inertial force producing same.

8. A device as defined in claim 1 wherein said guide hole is circular, the mouth of said guide hole being smaller in diameter than the bottom thereof.

References Cited

UNITED STATES PATENTS

| | | | |
|---|---|---|---|
| 2,457,620 | 12/1948 | Abraham | 73—517 X |
| 2,718,610 | 9/1955 | Krawinkel | 73—514 X |
| 3,203,237 | 8/1964 | Ogren. | |
| 3,205,715 | 9/1965 | Meek | 73—516 |

FOREIGN PATENTS 116,375   6/1918   Great Britain.

JAMES J. GILL, *Acting Primary Examiner.*

R. QUEISSER, *Assistant Examiner.*